United States Patent [19]
Kisaki et al.

[11] 3,843,733
[45] Oct. 22, 1974

[54] METHOD FOR PRODUCING 2-BUTENE-1,4-DIOL

[75] Inventors: Hisashi Kisaki; Shunsuke Mabuchi; Yukihiro Tsutsumi, all of Oaza Tonda, Japan

[73] Assignee: Toyo Soda Manufacturing Co., Ltd., Yamaguchi-ken, Japan

[22] Filed: Dec. 20, 1972

[21] Appl. No.: 317,050

Related U.S. Application Data

[63] Continuation of Ser. No. 62,978, Aug. 11, 1970, abandoned.

[30] Foreign Application Priority Data

Aug. 14, 1969 Japan.............................. 44-63839

[52] U.S. Cl............. 260/636, 23/252 R, 260/637 R
[51] Int. Cl............................................. C07c 31/18
[58] Field of Search............................ 260/636, 640

[56] References Cited
UNITED STATES PATENTS

| | | | |
|---|---|---|---|
| 2,318,032 | 5/1943 | Griendt et al........................ | 260/636 |
| 2,868,846 | 1/1959 | Lawlor et al........................ | 260/640 |
| 3,060,237 | 10/1962 | Bain.................................... | 260/636 |
| 3,349,129 | 10/1967 | Stogryn et al........................ | 260/636 |

Primary Examiner—Joseph E. Evans
Attorney, Agent, or Firm—Flynn & Frishauf

[57] ABSTRACT

A method for selectively producing 2-butene-1,4-diol in the presence of a buffering amount of a water-soluble salt of a carboxylic acid and with the addition of alkali or a salt which shows alkalinity on hydrolytic dissociation.

9 Claims, 1 Drawing Figure

3,843,733

METHOD FOR PRODUCING 2-BUTENE-1,4-DIOL

This is a continuation, of application Ser. No. 62,978, filed Aug. 11, 1970 and now abandoned.

FIELD OF THE INVENTION

This invention relates to a process for selectively producing 2-butene-1,4-diol by hydrolysis of 1,4-dihalo-2-butene.

DESCRIPTION OF THE PRIOR ART

In the hydrolysis of 1,4-dihalo-2-butene in general, it is conventional to employ an aqueous solution of alkali or an aqueous solution of a salt (such as, for example, a carbonate or a bicarbonate) which shows alkalinity on hydrolytic dissociation, but such a process gives only very low yields of 2-butene-1,4-diol. For example, even if a pure grade of 1,4-dichloro-2-butene is employed, the amount of byproduct 3-butene-1,2-diol will be as high as 10 to 30 percent and, under certain circumstances, as much as 10 to 60 percent of high-boiling compounds and polymers will be produced. That is to say, the yield of the desired product 2-butene-1,4-diol is as low as 50 percent or less.

SUMMARY OF THE INVENTION

We have discovered, however, that if the hydrolysis reaction is conducted in the presence of a water-soluble salt of a carboxylic acid, with the reaction system being adjusted to a pH of up to 11 and, preferably, less than 10, 2-butene-1,4-diol is produced in a high yield. This invention is therefore directed to a method for producing 2-butene-1,4-diol which comprises subjecting 1,4-dihalo-2-butene to hydrolysis in the presence of a water-soluble salt of a carboxylic acid and with the addition of an alkali or a salt which shows alkalinity on hydrolytic dissociation.

BRIEF DESCRIPTION OF THE DRAWING

The accompanying Drawing shows a flow diagram representing one mode of practice of this invention.

DETAILED DESCRIPTION OF THE INVENTION

Figure 1:
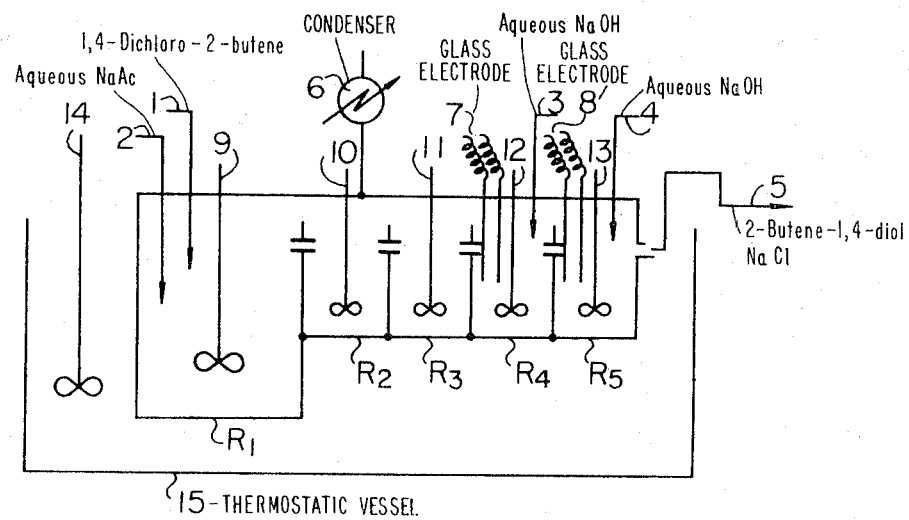

This invention is characterized in that the hydrolysis of 1,4-dihalo-2-butene is conducted in the presence of a water soluble salt of a carboxylic salt with the addition of an alkali or alkaline salt in such a manner that the reaction mixture will be maintained between the pH of the carboxylic acid constituting the salt in aqueous solution (which is usually above pH 3) and pH 11.

While the pH of the reaction system should thus be maintained in the range of pH about 3 to pH about 11 and, preferably, pH 4 to pH 10, it is not essential to maintain a constant pH level throughout the reaction.

The aforesaid water-soluble salt of carboxylic acid is preferably the alkali metal salt or ammonium salt of a carboxylic acid which preferably contains two to four carbon atoms each, such as, for example, acetic acid, propionic acid, oxalic acid or butyric acid. The carboxylate serves as a buffering agent. If the amount of the carboxylate is too small, the hydrogen halide formed on hydrolysis of the starting material halogen compound will contribute to over-acidity (pH less than 3) and, consequently, more lighter byproducts are formed to detract considerably from the yield of the desired product.

On the other hand, if an excess amount of alkali, ammonia or an alkaline salt is added (pH over 11), the yields of heavy byproducts increase so much that still greater reductions in yield of the desired product are encountered.

With the progress of the reaction, the reaction mixture generally becomes acidic, but insofar as the pH of the mixture lies within the aforesaid range, the addition of the alkali or alkaline salt may be effected in a single dose after the dihalobutene has completely disappeared. In that case, however, the gradual decrease in amount of the carboxylate with the progress of the reaction would cause a reduction in reaction velocity. It is also necessary to provide for a suitable cooling-off period, for the vigorous evolution of heat often causes the system to boil over or spatter. On the other hand, if the addition of the alkali, ammonia or alkaline salt is effected in the course of the reaction, the reaction time (the time which elapses before the dihalobutene disappears) will be reduced to approximately one-half and the reaction may be carried to completion without the provision of a cooling-off time.

Adjustment of the reaction system to the specified pH range may be carried out with a simple pH adjusting means, but the simplest possible method is the previous addition, either singly or in combination, of indicator materials having suitable color-change points, such as methyl orange and phenolphthalein.

The proportion of the carboxylate to be employed is practically optional relative to the amount of the starting material dihalobutene. In the case of certain carboxylic acids, including acetic acid, the esters may be encountered, but the carboxylates will be regenerated upon addition of an alkaline substance. However, if the proportion of the carboxylate is too small, it is difficult to maintain the reaction system within the required pH range and the formation of byproduct 3-butene-1,2-diol is also increased. Contrariwise, an excess of the carboxylate complicates the procedure for recovery of the desired product 2-butene-1,4-diol, though the yield of the 1,4-diol is not affected.

If the pH adjustment with alkali, ammonia or an alkaline salt is effected without the presence of a carboxylate, it is still possible to obtain 2-butene-1,4-diol in a higher yield than it would be possible without such a pH adjustment. However, such a practice results in the formation of an appreciable amount of 3-butene-1,2-diol and has proved unsatisfactory for commercial purposes.

The following examples are further illustrative of this invention.

EXAMPLE 1

A 500 ml round-bottom flask equipped with a stirrer, reflux condenser and drip funnel was charged with 62.5 g 1,4-dichloro-2-butene, 102.5 g sodium acetate and 110 g water, followed by the addition of bromocresol purple indicator. The reaction mixture was stirred at 105°C for 120 minutes.

Then, the stirring was continued with the dropwise addition of 48% aqueous solution of sodium hydroxide so that the pH of the reaction system would not exceed the color-change point of the bromocresol purple. In 60 minutes after the start of dropwise addition of sodium hydroxide, the amount of the sodium hydroxide so added reached substantially the equivalent of the chlorine contained in the starting material dichlorobutene. The reaction system was further heated and stirred for 20 minutes. The system was dehydrated to apparent dryness on a rotary evaporator and the resulting crystals were treated with tetrahydrofuran. After removal of the extractant tetrahydrofuran by distillation, 44.8 g of a residue was obtained. Gas chromatographic analysis of this residue reveals the presence of 89.3 percent 2-butene-1,4-diol and 2.1 percent 3-butene-1,2-diol.

The yield of the former was 91.1 percent.

EXAMPLE 2

With the use of an apparatus similar to that described in Example 1, 62.5 g 1,4-dichloro-2-butene, 122.5 g potassium acetate and 110 g water were reacted at 105°C for 120 minutes. Bromocresol purple was used as indicator and 48 percent aqueous solution of sodium hydroxide was added. The reaction mixture was treated in a manner similar to that described in Example 1 to obtain 44.3 g of a product.

Gas chromatographic analysis of the product revealed the presence of 87.6 percent by weight of 2-butene-1,4-diol and 2.0 percent by weight of 3-butene-1,2-diol. The yield of the former product was 88.2 percent.

EXAMPLE 3

With the use of an apparatus similar to that described in Example 1, 62.5 g 1,4-dichloro-2-butene, 82.5 g lithium acetate and 110 g water were reacted at 105° for 12 minutes.

Bromocresol purple was used as indicator and 48 percent aqueous solution of sodium hydroxide was added. The reaction mixture was treated in a manner similar to that described in Example 1, whereupon 45.1 g of a reaction product was obtained.

Gas chromatographic analysis of this product revealed the presence of 90.2 percent by weight of 2-butene-1,4-diol and 4.3 percent by weight of 3-butene-1,2-diol. The yield of the former was 92.5 percent.

EXAMPLE 4

An apparatus similar to that described in Example 1 was charged with 62.5 g 1,4-dichloro-2-butene, 95 g ammonium acetate and 110 g water. With the addition of phenolphthalein indicator, the reaction was conducted at 105°C for 120 minutes, under constant stirring. The stirring was further continued with the dropwise addition of 28 percent aqueous solution of ammonia so that the pH of the system would not exceed the color-change point of phenolphthalein. In 60 minutes after the start of dropwise addition of aqueous ammonia, the amount of aqueous ammonia so added was substantially equivalent to the chlorine contained in the starting material dichlorobutene. The reaction mixture was further heated and stirred for 20 minutes. The mixture was dehydrated to apparent dryness on a rotary evaporator, followed by extraction with tetrahydrofuran. The solvent was distilled off to obtain 43.5 g of a residue. Gas chromatographic analysis of this product revealed the presence of 85.6 percent by weight of 2-butene-1,4-diol and 7.4 percent by weight 3-butene-1,2-diol. The yield of the former product was 84.7 percent.

EXAMPLE 5

An apparatus similar to that described in Example 1 was charged with 62.5 g 1,4-dichloro-2-butene, 103 g sodium acetate and 110 g water. With the addition of bromocresol purple, the reaction was allowed to proceed at 110°C for 150 minutes, under constant stirring. The stirring was continued with the dropwise addition of 48 percent aqueous solution of sodium hydroxide so that the pH of the reaction mixture would not exceed the color-change point of bromocresol purple.

In 90 minutes after the start of dropwise addition of sodium hydroxide, the amount of sodium hydroxide so added was substantially equivalent to the chlorine contained in the starting material dichlorobutene.

The reaction system was further heated and stirred for 20 minutes, at the end of which time the system was dehydrated to apparent dryness on a rotary evaporator, followed by extraction with tetrahydrofuran. The extractant tetrahydrofuran was distilled off to recover 45.0 g of a residue. Gas chromatographic analysis of this product revealed the presence of 84.7 percent by weight of 2-butene-1,4-diol and 4.5 percent by weight of 3-butene-1,2-diol.

The yield of the former product was 87.6 percent.

EXAMPLE 6

An apparatus similar to that described in Example 1 was charged with 102 g 1,4-dibromo-2-butene, 103 g sodium acetate and 110 g water, and the reaction was allowed to proceed at 105°C for 20 minutes, under constant stirring.

Then, with the dropwise addition of 48 percent aqueous solution of sodium hydroxide by means of a pH adjusting device, the reaction was further continued for 120 minutes at a constant pH of 9. The reaction mixture was treated in a manner similar to that described in Example 1 to obtain 45.2 g of a residue. Gas chromatographic analysis of this product revealed the presence of 87.9 percent by weight of 2-butene-1,4-diol and 2.4 percent by weight of 3-butene-1,2-diol. The yield of the former product was 90.3 percent.

EXAMPLE 7

An apparatus similar to that described in Example 1 was charged with 62.5 g 1,4-dichloro-2-butene, 140 g normal sodium butyrate and 110 g water, and the reaction was allowed to proceed at 105°C for 30 minutes, under constant stirring. Then, with the dropwise addition of 48 percent aqueous solution of sodium hydroxide by means of a pH adjusting device to maintain the reaction system at pH 5 – 6, the reaction was further allowed to proceed for 150 minutes. The reaction mixture was treated in a manner similar to that described in Example 1 to recover 44.5 g of a residue. Gas chromatographic analysis of the residue revealed the presence of 82.3 percent by weight of 2-butene-1,4-diol and 2.5 percent by weight of 3-butene-1,2-diol. The yield of the former product was 83.3 percent.

EXAMPLE 8

A mode of practice of this invention by continuous method will be described by reference to the accompanying Drawing.

A series of reactors $R_1$, $R_2$, $R_3$, $R_4$ and $R_5$, which were equipped with agitators 9, 10, 11, 12 and 13, respectively, were connected in series as illustrated.

The average retention time of the reaction mixture in $R_1$ was 1.08 hours, and that in each of $R_2$, $R_3$, $R_4$ and $R_5$ was 0.32 hour. The total retention time was 2.36 hours. 1,4-Dichloro-2-butene, which was preheated to 80° – 100°C, was introduced into $R_1$ through a feed pipe 1 at the rate of 1.25 kg/hour, and a 60.3 percent aqueous solution of sodium acetate, which was preheated to 80° – 100°C, was fed through a pipe 2 at the rate of 3.40 kg/hour.

The five reactors were maintained at 110°C in a thermostatic vessel 15 which was equipped with agitator means 14.

In $R_4$, the pH of the reaction mixture was detected with a glass electrode 7, and a 48 percent aqueous solution of sodium hydroxide was added through a pipe 3 to maintain the reaction mixture at pH 5 – 6. Similarly in $R_5$, with the use of a glass electrode 8 and a pipe 4, a 48 percent aqueous solution of sodium hydroxide was introduced to maintain the reaction mixture at pH 8.5 – 9.5. The heat evolved upon the addition of aqueous sodium hydroxide solution in $R_4$ and $R_5$ was dissipated by means of a reflux condenser 6.

The reaction mixture recovered through a pipe 5 (6.32 kg/hour) contained 0.97 kg of sodium chloride crystals per hour. This reaction product was treated in a manner similar to that described in Example 1. The yield of 2-butene-1,4-diol was 9.79 kg/hour or 89.8 percent. The conversion of 1,4-dichloro-2-butene was 99.8 percent.

We claim:

1. In a process for preparing 2-butene-1,4-diol by hydrolysis of a 1,4-dihalo-2-butene selected from the group consisting of 1,4-dichloro-2-butene and 1,4-dibromo-2-butene, the improvement which comprises contacting said 1,4-dihalo-2-butene with water at a temperature of the range of 105°–110°C, in the presence of a water-soluble salt selected from the group consisting of an alkali metal salt and an ammonium salt of acetic acid, propionic acid, oxalic acid or butyric acid and in the presence of an alkaline material selected from the group consisting of sodium hydroxide and ammonia sufficient to maintain the reaction system in the range of pH 3 to pH 11, whereby 2-butene-1,4-diol is formed selectively.

2. The process of claim 1, wherein the pH range is from 4 to 10.

3. The process of claim 1, wherein the 1,4-dihalo-2-butene is 1,4-dichloro-2-butene.

4. The process of claim 1, wherein the alkali metal salt is an alkali metal acetate.

5. The process of claim 1, wherein the alkali metal salt is sodium acetate.

6. The process of claim 1, wherein the alkali metal salt is sodium butyrate.

7. The process of claim 1, wherein the ammonium salt is ammonium acetate.

8. The process of claim 1, wherein the alkaline material is sodium hydroxide.

9. The process of claim 1, wherein the alkaline material is ammonia.

* * * * *